E. C. BROWN.
SPRAY NOZZLE.
APPLICATION FILED JUNE 17, 1904.
903,953.
Patented Nov. 17, 1908.
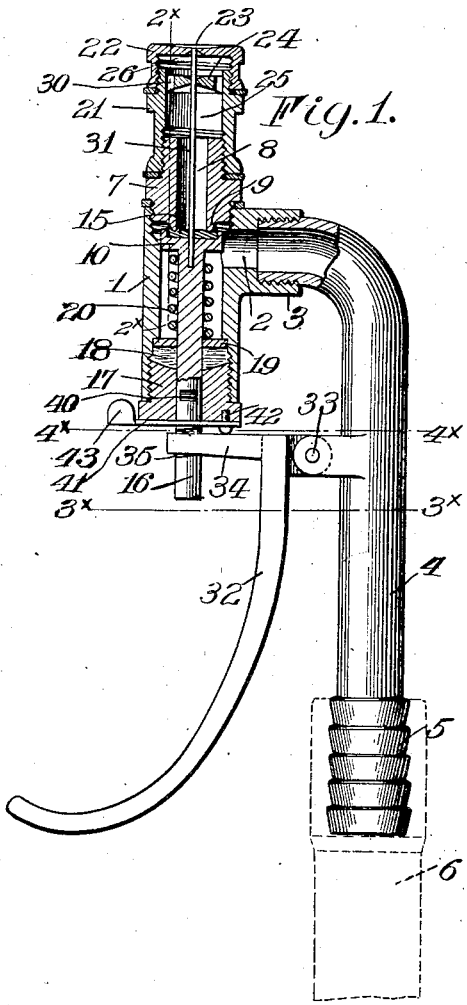
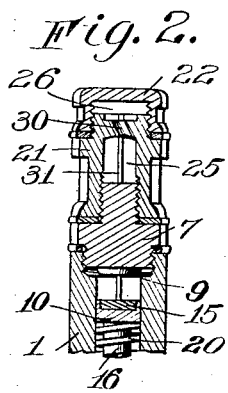
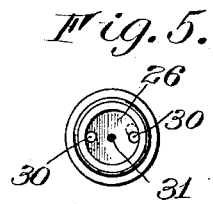
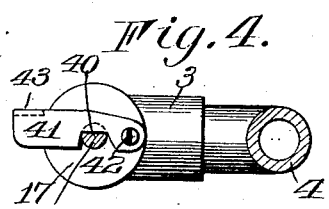
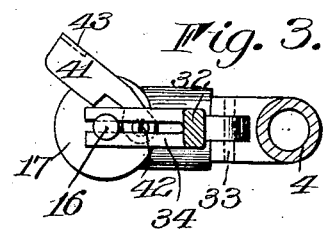
Witnesses.
Walter B. Payne
Russell B. Griffith
Inventor.
Edward C. Brown
by Frederick S. Church
his Attorney

UNITED STATES PATENT OFFICE.

EDWARD C. BROWN, OF ROCHESTER, NEW YORK.

SPRAY-NOZZLE.

No. 903,953.

Specification of Letters Patent.

Patented Nov. 17, 1908.

Application filed June 17, 1904. Serial No. 212,921.

*To all whom it may concern:*

Be it known that I, EDWARD C. BROWN, of Rochester, in the county of Monroe and State of New York, have invented certain new and useful Improvements in Spray-Nozzles; and I do hereby declare the following to be a full, clear, and exact description of the same, reference being had to the accompanying drawings, forming a part of this specification, and to the reference-numerals marked thereon.

My present invention relates to spray nozzles or heads such as are used particularly for spraying plants, trees and shrubbery, although equally well adapted for other purposes, and it has for its object to provide a simple and compact form of the device which may be held in the operator's hand and the operation of the valve therein governed at will by the compression of the fingers on a valve controlling member.

My invention has for its further object to provide an improved construction of the nozzle which facilitates its manufacture and also permits the parts thereof to be readily separated, if so desired.

My invention further provides means for automatically removing and preventing a deposit of sediment, or other foreign matter, from clogging the spray orifice of the nozzle.

To these and other ends the invention consists in certain improvements and combinations of parts, all as will be hereinafter more fully described the novel features being pointed out in the claims at the end of the specification.

In the drawings: Figure 1 is a side elevation of spray nozzle contsructed in accordance with my invention, parts thereof being shown in section. Fig. 2 is a longitudinal sectional view through the barrel of the nozzle taken on the line 2× 2× of Fig. 1. Fig. 3 is a cross sectional view taken on the line 3× 3× of Fig. 1. Fig. 4 is a similar view taken on the line 4× 4×, and Fig. 5 is a detail plan view of the tip piece, the nozzle cap having been removed.

The nozzle shown illustrating the present embodiment of my invention is one which it is intended to employ for applying liquid insecticide and fungicide compounds, to plants, trees and shrubbery, and it consists of a hollow tubular barrel 1, open at the ends and containing a valve as will be presently more fully described, in rear of which enters the passage 2 formed in the laterally extending boss 3 provided with the internal screw threads adapted to receive the threaded end of a feed pipe 4. The latter is bent, as shown in Fig. 1, and extends parallel to and rearwardly of the barrel 1 so as to form a suitable handle for manipulating the nozzle. At its lower end the feed pipe is provided with a series of annular ribs or corrugations 5, whereby it may be securely attached to the end of a hose pipe 6, as indicated in dotted lines, leading from any convenient source of supply and adapted to convey fluid under pressure to the nozzle.

The outer end of the barrel 1 is threaded, and removably secured thereto is a sleeve 7 having the central passage 8, the lower end of which is surrounded by an annular rim 9 forming a valve seat. Coöperating with the latter is a valve head 10, recessed on its face to receive a packing disk 15 and provided with a rearwardly extending stem 16, the extremity of which projects through the adjustable sleeve 17, employed for compressing the packing 18 against the inner face of a gland washer 19, between which and the head 10 is the spring 20, operating to normally hold the valve head against its seat.

The spray head of the nozzle embodies the tip piece 21, removably secured to the sleeve 7, the outer end thereof being closed by the cap piece 22, the face of which is slightly concave and provided at its center with a discharge orifice 23. Located in the tip piece is a diaphragm 24 which divides the tip 21 into inner and outer chambers 25 and 26 respectively, which are connected by perforations 30 passing diagonally through the diaphragm, as shown in Figs. 2 and 5, in such a manner that as the liquid passes from the inner to the outer chamber it will be caused to swirl in the latter chamber before it is emitted from the discharge orifice 23 in the cap. The diaphragm 24 is also provided with a central aperture, arranged in alinement with the aperture 23 of the nozzle cap, and extending therethrough is a pin 31 attached to the valve head and having its outer end arranged to project into the discharge orifice 23, when the valve is closed, as shown in Fig. 1, for the purpose of removing from the orifice any deposit of sediment, or foreign matter, carried in the liquid, which might clog it.

The means for moving the valve head relatively to its seat against the tension of the spring 20 and the pressure of the liquid introduced into the barrel 1, through the feed pipe, consists of a movable handle in the form of a lever 32, pivoted to the pipe 4 at the point 33 and having the laterally extending bifurcated end 34 engaging in notches 35 formed at opposite sides of the valve stem 16. This handle is arranged in proximity to the stationary handle, formed by the feed pipe 4, to enable it to be conveniently operated by the fingers of the hand which also holds the nozzle and to form a convenient grasp for the fingers, the end of the handle is curved outwardly, as shown. As it frequently happens that the spray discharged from the nozzle is used continuously, for a considerable length of time, and it is not always convenient for the operator to exert a sufficient pressure on the operating handle to hold the valve open, when directing the nozzle to throw the spray therefrom in different directions, I provide a locking device for retaining the valve in the open position. In the present instance I provide the valve stem with a notch 40 arranged thereon so that it will be withdrawn from the sleeve 17, of the packing gland, when the valve is opened; and coöperating therewith is a latch 41 pivoted to said sleeve by a screw 42 and having at its outer end an ear or finger piece 43 by means of which it may be readily moved into and out of the operative position, as shown in Figs. 3 and 4.

The arrangement of the parts of the nozzle as shown and described is an advantageous one, as will be readily seen. By removing the sleeve 7 access may be conveniently had to the valve seat and the valve head either for the purpose of renewing the packing on the latter, or for removing any obstructions that may become lodged thereon. The tip piece 21 being removable from the sleeve, permits the chamber 22 to be formed therein whereby a reservoir is provided so that liquid under pressure is always seeking exit through the perforations 30 and in case there is a stoppage of the latter the obstruction may be readily removed. Further, if desired, different tip pieces and caps may be employed having apertures and discharge orifices of greater or less area to permit an operator to regulate the density of the spray. It will be understood, however, that these parts might be formed integrally, and that the handle 4 might also be similarly attached to the barrel 1, but the present method of forming the handle and barrel, in separate pieces permits these parts to be more readily manufactured and the whole device given a finished appearance before they are connected.

I claim as my invention:

1. In a discharge nozzle, the combination with a barrel, a valve seat and an outlet, of a valve head in the barrel having an operating portion extending to the exterior of the barrel, a pin mounted on the valve and adapted to work in the outlet, and a diaphragm arranged between the valve seat and the outlet, guiding the pin and having diagonal perforations for producing a swirl in the material discharged.

2. In a spray nozzle, the combination with a tubular barrel, a valve therein comprising a movable valve head and a removable tip piece, of a perforated cap detachably mounted on the tip piece, a diaphragm located within the latter provided with discharge perforations and having an aperture located in alinement with the one in the cap, a pin attached to the valve head and extending through the apertures in the diaphragm and cap and means for reciprocating the valve head in the barrel.

EDWARD C. BROWN.

Witnesses:
G. WILLARD RICH,
ELIZABETH I. ALDRICH.